United States Patent
Berger et al.

(10) Patent No.: US 9,991,486 B2
(45) Date of Patent: Jun. 5, 2018

(54) ION-CONDUCTING SOLID-STATE SEPARATOR

(75) Inventors: Thomas Berger, Pfinztal (DE); Markus Hagen, Kronau (DE)

(73) Assignee: FRAUNHOFER-GESELLSCHAFT ZUR FORDERUNG DER ANGEWANDTEN FORSCHUNG E.V. (DE)

( * ) Notice: Subject to any disclaimer, the term of this patent is extended or adjusted under 35 U.S.C. 154(b) by 58 days.

(21) Appl. No.: 13/983,741

(22) PCT Filed: Feb. 7, 2012

(86) PCT No.: PCT/EP2012/052007
§ 371 (c)(1),
(2), (4) Date: Oct. 18, 2013

(87) PCT Pub. No.: WO2012/107425
PCT Pub. Date: Aug. 16, 2012

(65) Prior Publication Data
US 2014/0045096 A1    Feb. 13, 2014

(30) Foreign Application Priority Data
Feb. 8, 2011  (DE) .......... 10 2011 003 746

(51) Int. Cl.
*H01M 8/02* (2016.01)
*H01M 2/16* (2006.01)
*H01M 2/14* (2006.01)
*H01M 2/18* (2006.01)
*H01M 8/1065* (2016.01)
*H01M 10/0565* (2010.01)
(Continued)

(52) U.S. Cl.
CPC ........... *H01M 2/16* (2013.01); *C25B 13/02* (2013.01); *H01M 2/145* (2013.01); *H01M 2/164* (2013.01); *H01M 2/18* (2013.01); *H01M 8/023* (2013.01); *H01M 8/1065* (2013.01); *H01M 10/0565* (2013.01); *Y02E 60/521* (2013.01); *Y10T 29/49108* (2015.01)

(58) Field of Classification Search
CPC .......... H01M 2/16; H01M 2/14; H01M 2/145; H01M 8/02; H01M 8/023
USPC .............. 429/508–509, 247–249; 29/623.1
See application file for complete search history.

(56) References Cited

U.S. PATENT DOCUMENTS

| 4,668,320 A | 5/1987 | Crabtree |
| 5,830,603 A | 11/1998 | Oka et al. |

(Continued)

FOREIGN PATENT DOCUMENTS

| DE | 102007053739 A1 | 5/2009 | |
| EP | 1689014 A1 * | 8/2006 | .............. H01M 8/10 |

(Continued)

OTHER PUBLICATIONS

Japanese Office Action dated Sep. 2, 2014.
(Continued)

*Primary Examiner* — Karie O'Neill Apicella
(74) *Attorney, Agent, or Firm* — Tarolli, Sundheim, Covell & Tummino LLP

(57) ABSTRACT

Solid-state separator for electrochemical systems, wherein the solid-state separator consists of a plurality of ion-conducting solid-state segments, and the individual solid-state segments are connected by means of a deformable, electrically insulating material.

12 Claims, 3 Drawing Sheets

Connected solid-state segments (variant 4)

(51) Int. Cl.
*C25B 13/02* (2006.01)
*H01M 8/023* (2016.01)

(56) References Cited

U.S. PATENT DOCUMENTS

| | | |
|---|---|---|
| 2005/0208383 A1 | 9/2005 | Totsuka |
| 2011/0294031 A1 | 12/2011 | Fujisawa et al. |

FOREIGN PATENT DOCUMENTS

| | | | | | |
|---|---|---|---|---|---|
| JP | 2003157823 A | * | 5/2003 | ............. | H01M 2/16 |
| JP | 2005243427 A | * | 9/2005 | ............. | H01M 8/02 |
| JP | 2006244880 A | | 9/2006 | | |
| JP | 2013552232 | | 8/2013 | | |
| WO | WO 2005031906 | * | 4/2005 | ............. | H01M 8/10 |
| WO | 2007020242 A1 | | 2/2007 | | |

OTHER PUBLICATIONS

First Japanese Office Action dated Apr. 16, 2015.
Heinz Kohler, et al. "Nasicon Solid Electrolytes, Part I: The Na-Diffusion Path and its Relation to the Structure", Mat. Res. Bull., vol. 20, pp. 1461-1471, 1985.
P.G. Bruce, et al. "Ionic Conductivity of LISICON Solid Solutions, U2+uZn1_xrGeO4", Journal of Solid State Chemistry 44, 354-365 (1982).
First German Office Action dated Sep. 17, 2015.
Office Action for Japanese Application No. 2013-552232 dated Sep. 2, 2014.

* cited by examiner

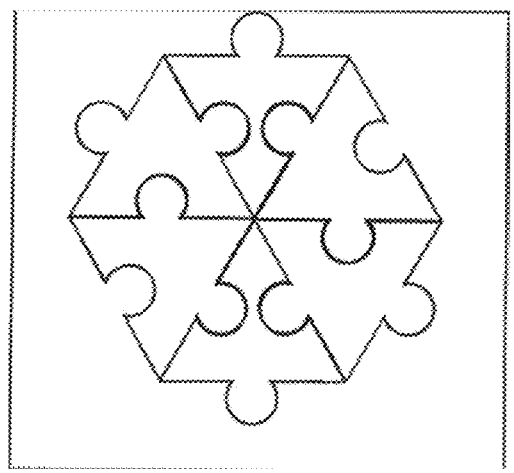
Figure 1:  Connected solid-state segments (variant 1)
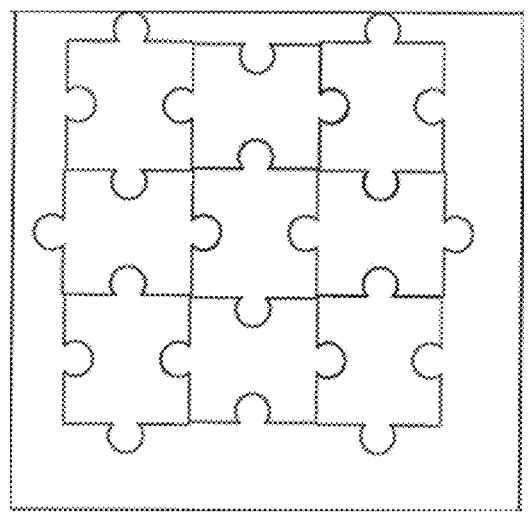
Figure 2:  Connected solid-state segments (variant 2)

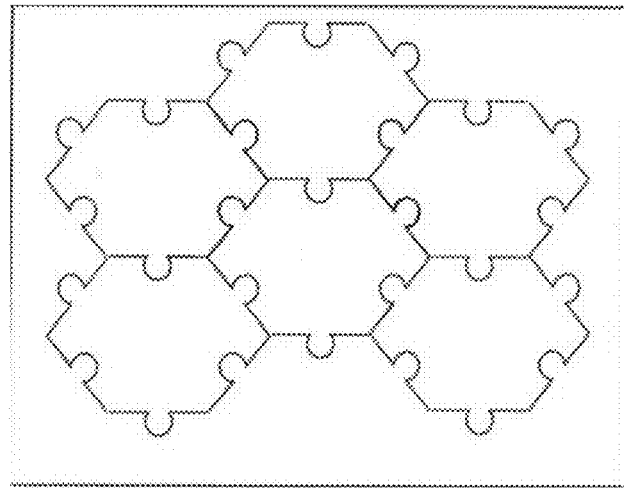
Figure 3: Connected solid-state segments (variant 3)
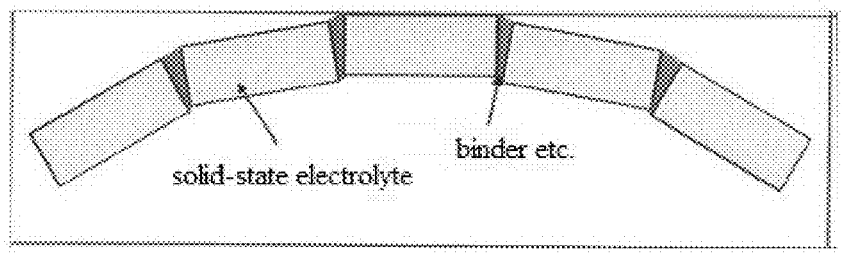
Figure 4: Connected solid-state segments (variant 4)
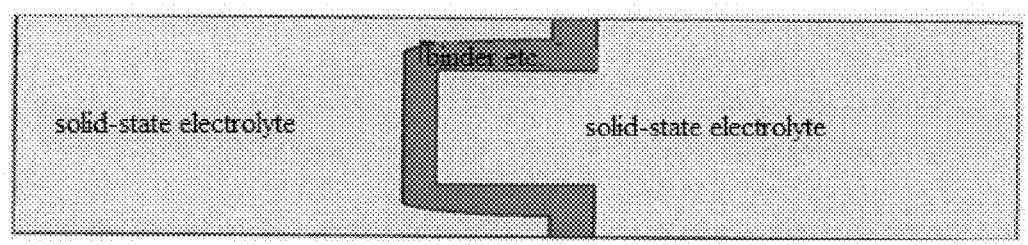
Figure 5: Connected solid-state segments (variant 5)

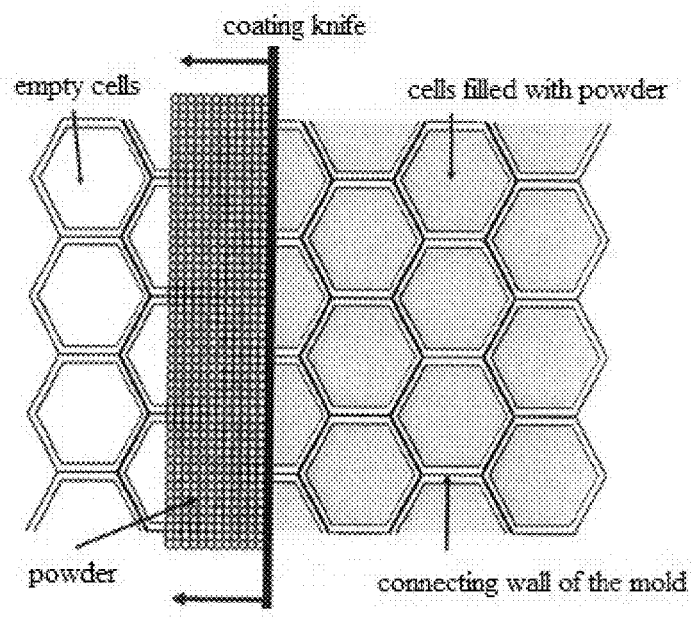
Figure 6: Preparation of a solid-state separator

ION-CONDUCTING SOLID-STATE SEPARATOR

RELATED APPLICATION

This application is a National Phase filing of PCT/EP2012/052007, filed Feb. 7, 2012, which claims priority to German Patent Application No. 10 2011 003 746.2, filed Feb. 8, 2011, the subject matter of which are incorporated herein by reference in their entirety.

The present invention relates to a novel solid-state separator for electrochemical systems, as well as the use thereof.

In most cases in electrochemical systems, at least two electrodes at which electrochemical reactions occur must be electronically insulated from each other. To achieve a charge balance during the electrochemical reactions at the electrodes, it is necessary that the ions be able to migrate between the electrodes; however, the electrodes must also be electronically isolated from each other to prevent a short circuit. Depending on the electrochemical system applied, these may be anions, cations, or both at the same time. In order to cause a separation in electrochemical systems, so-called separators are used.

The transport of ions within an electrochemical system can be carried out in different ways. In principle, the following mechanisms apply:

At least one ionic compound (salt) is present in the molten state and is thereby at least partially dissociated. Thus, for example, in the production of aluminum, a molten mixture of aluminum oxide and cryolite is present as an electronically insulating separating layer between the carbon cathode and aluminum anode. In this case, the mixture has a composition close to the eutectic point. Salts with a particularly low melting point include ionic liquids in which at least partially higher melting salts can be dissolved.

At least one ionic compound (salt) is dissolved in a solvent and is thereby at least partially dissociated. As an example, the lithium ion battery is described in which a lithium salt (e.g. $LiPF_6$) is dissociatively dissolved in a mixture of organic carbonates (e.g. EC/DMC). The solvated lithium ions may migrate between the anode and cathode during charge/discharge of the storage battery.

The counter ion of the migrating species is fixed to a backbone. Thus in polymer electrolyte membrane fuel cells (PEM-FCs), cation exchange membranes are used. In these cation exchange membranes, the anions (e.g., sulfonic acid groups) are chemically bound to a backbone polymer (e.g., PTFE), and therefore cannot migrate. To sufficiently transport protons through the membrane, they should be present in a solvated state. Here, the solvation shell is transported together with the protons through the membrane (electro osmotic drag).

Ion conduction through a solid-state body. As an example, the Na/S battery cell is mentioned in which a sintered body of $\beta''-Al_2O_3$ is used between the molten sodium electrode and the sulfur electrode as a separation layer. $\beta''-Al_2O_3$ is an electronically insulating layer compound through which the sodium ions can migrate in the respective layer. In the case of the Na/S battery cell, sulfur/sodium polysulfides are completely separated from the sodium, thereby preventing a direct chemical reaction of these materials. Solid ionic conductors are usually highly selective (migration of only one type of ion) and allow the transport of unsolvated ions.

Unlike sensor systems (possibly also electrochromic systems) in which usually only very small, surface-related current densities act in the separation material, large, surface-related current densities at the lowest possible energy losses are required for electrochemical energy conversion systems. From this and from a manufacturing point of view, the following general requirements for the separation of electrochemical energy conversion systems have resulted:

High ionic conductivity of the migrating species at the same time as electronic infinitely high resistance to prevent a short circuit in the system.

High selectivity with respect to the migrating species. The transport number of the migrating species should preferably be 1 in order to prevent concentration polarization in the system.

Lowest possible thickness of the separation to keep the energy losses due to the IR drop caused by the migration of ions as low as possible.

High mechanical strength of the separation to avoid a penetration of the separation during assembly and during operation of the electrochemical converter cell.

Easy processing of the separator. For example, flat, thin layers of sintered ceramic material or glass/glass-ceramics can be processed in a very restricted manner because these materials break easily due to their brittle nature.

Chemical stability towards the media that come into contact with the separation material.

Large thermal stability in order to avoid the formation of an internal short circuit in the event of overheating.

Separators currently being used satisfy only some of the desired properties. The properties of the separation materials with their advantages and disadvantages will be represented exemplarily using two examples:

BRIEF DESCRIPTION OF THE DRAWINGS

FIG. 1 is a schematic illustration of connected solid-state segments (variant 1).

FIG. 2 is a schematic illustration of connected solid-state segments (variant 2).

FIG. 3 is a schematic illustration of connected solid-state segments (variant 3).

FIG. 4 is a schematic illustration of connected solid-state segments (variant 4).

FIG. 5 is a schematic illustration of connected solid-state segments (variant 5).

FIG. 6 is a schematic illustration of the preparation of a solid-state separator.

Polyolefin separators for Li ion cells:

The current standard separator materials for Li ion cells are porous, hydrophilized polymer films of polyethylene, polypropylene, or combinations of this polymer. The separator material is filled with an electrolyte solution, in which ion transport between the electrode materials occurs. Conventional electrolyte solutions include mixtures of organic carbonates, partly with a small amount of organic additives (top layer formers) in which a lithium conducting salt is dissolved (e.g. $LiPF_6$). The separator material is not involved in the ion conduction itself and serves only as electronically insulating spacers between the electrodes. The reduction potential of lithiated graphite, which is currently a conventional anode material in the charged state of a Li ion cell, is so negative that the organic compounds of the electrolyte solution used are not thermodynamically stable; therefore, parts of the electrolyte solution are reduced during the first charging of a Li ion cell (formation) on the surface of the graphite particles to form a thin polymer film (SEI=solid electrolyte interface). The SEI is electronically insulating, thereby preventing a further reduction of the organic components of the electrolyte solution at a very little layer thickness. In addition, the SEI is lithium ion conducting and therefore allows a transfer of lithium ions between the graphite and the electrolyte solution. Favorable properties of these systems include their very thin setup (up to 9 µm), their relatively high mechanical strength, their ease of processing, and their relatively high ionic conductivity. Drawbacks of such materials include poor thermal stability (polyolefins have a melting point below 200° C.), no thermodynamic stability of the electrolyte solution towards lithiated graphite, and a transport number of $Li^+$-ions<1.

β''-$Al_2O_3$-sintered ceramic tubes for Na/S battery cells:

Na/S battery cells belong to the high-temperature storage batteries, in which the active anode material is molten sodium. This is in direct contact with a β''-$Al_2O_3$-sintered ceramic tube (separator), which is electronically insulating and sodium ion-conducting, and forms the separation to the catholyte region of the cell. In the catholyte region, the active cathode material (sulfur and sodium polysulfide) is in a molten state and also in direct contact with the separator. This results in favorable properties for the separator, such as thermodynamic stability towards both liquid sodium and towards sulfur and sodium polysulfide, high selectivity for $Na^+$ conductivity, high thermal stability, relatively high specific ionic conductivity, especially at high temperatures and high mechanical strength of the polycrystalline sintered ceramic. The disadvantages of such a separator include large separating layer thicknesses and very limited processing possibilities for very thin, flat sintered films, where even slight bending stress leads to the rupture of a thin sintered ceramic film.

The object of the present invention is therefore to provide a solid-state separator for electrochemical systems, which combines the advantages of the known separators and avoids their disadvantages. It is a particular object of the present invention to combine the advantages of solid-state separators and polyolefin separators, i.e., high thermal stability, high mechanical strength, high specific ionic conductivity, high selectivity of ion conduction, large chemical stability, low separator thickness and easy processability.

The invention is based on the knowledge of the production of small segments from ion-conducting solid-state bodies and the connection of these using ductile, electrically insulating materials, thus forming a solid-state separator of a desired shape and size.

Therefore, the present invention is directed to solid-state separator for electrochemical systems, wherein the solidsate separator consists of a plurality of ion-conducting solid-state segments, and the individual solid-state segments are connected by means of a deformable, electrically insulating material.

The solid-state separators according to the present invention are characterized by many positive properties. Thus, the solid-state separators according to the present invention can be made very thin and in any form. Moreover, the use of ductile materials allows that the solid-state separators can be used in devices which are obtained by winding (e.g., in round cells). This means that the solid-state separators according to the present invention are bendable and flexible. Furthermore, they are ion-selective—depending on the electrically insulating material—temperature stable, and non-flammable; they do not form fumes when heated, such as is the case with organic liquid electrolytes. Self-charging processes which are based on the diffusion of a species between the anode and cathode are prevented by the solid-state separator.

The term "ductility" (or "ductile") according to the present invention is to be understood as a material property that enables the material to extend and stretch under (mechanical) stress.

Therefore, in the present invention an electrically insulating material is an adhesive material, a polymer, an organic liquid, or an inorganic liquid, e.g., ionic liquids, a gel, and any combination of the above-mentioned substance classes. Preferably, adhesives are used.

An adhesive according to the present invention is to be understood as a non-metallic material which can connect joined parts by surface bonding (adhesion) and/or inner strength (cohesion) (according to DIN EN 923). Particularly preferred adhesives are selected from group consisting of methyl methacrylate adhesives, radiation-curing adhesives, phenol formaldehyde resin adhesives, silicones, silane-crosslinking polymer adhesives, epoxy resin adhesives, polyurethane adhesives. In a particularly preferred embodiment, silicones are used.

The polymers may be both thermoplastic and thermosetting. The connection of the individual solid-state segments can be performed by introducing polymers between the solid-state segments by various methods:

via the molten state via a polymer solution and subsequent removal of the solvent, e.g., by evaporation via a suspension of polymer particles with subsequent sintering or melting of the particles via polymer oligomers, which are then cross-linked:

Particularly preferred polymers are thermoplastic polymers, especially thermoplastic polymers selected from the group consisting of polypropylene, polyethylene, such as ultra-high molecular weight polyethylene (UHMW-PE), polyethylene terephthalate (PET), polyamide (PA), polyvinylidene fluoride (PvdF), hexafluoropropylene (HFP), polytetrafluoroethylene (PTFE), polystyrene (PS), polymethyl methacrylate (PMMA), polybenzimidazole (PBI), polyvinylchloride (PVC) and copolymers of the above.

As organic or inorganic liquids, all compounds can be used which are capable of wetting the edge regions of the individual solid-state segments. It may be of advantage to coat the edge regions of the solid-state segments with a material which is much better wetted by the liquid than the solid-state segment itself. The cohesion between the individual segments can be improved in this case by a mechanical interlocking of the segments, as described in detail below. Exemplary embodiments of mechanical interlocking in this particular case are shown, for instance, in FIG. 1 to FIG. 3. The organic or inorganic liquid fills only the gap between the individual solid-state segments, thereby ensuring some flexibility of the segments among themselves and simultaneously separating the opposite-facing surfaces of the separator material. The liquid should preferably meet the following requirements:

no chemical reaction when in contact with the filling medium, anolyte or catholyte region very low vapor pressure in order to avoid evaporation of the liquid (ionic liquids are therefore particularly preferred)

no miscibility with the filling medium, anolyte or catholyte region

The solid-state segments can be connected together by a gel. For the gel, the same conditions apply as for the fluids described.

Ionic liquids include salts for example, in particular those which are in a liquid state at temperatures below 100° C. Ionic liquids selected from the group consisting of imidazolium compounds, pyridinium compounds, pyrilidonium compounds, tetraalkyl ammonium compounds, piperidinium compounds, and mixtures thereof are preferred.

For the ionic liquids, preferably the same conditions apply as those for the use of organic or inorganic liquids in separating the anolyte region from the catholyte region:
- the ionic liquids should not be miscible with the filling medium, anolyte or catholyte region,
- the mechanical connection of the segments is preferably carried out via the interlocking of the segments,
- no chemical reaction of the ionic liquid with the filling medium, anolyte or catholyte region.

In particular, the low vapor pressure of the ionic liquid makes it very suitable as an electrically insulating material since they do not evaporate substantially.

The ion-conducting solid-state segments include materials that have proven to be suitable separator materials. Therefore, the ion-conducting solid-state segments are selected from the group consisting of ceramics, glass ceramics, polymer solid electrolytes, single crystals and mixtures thereof. The following compounds have been proven to be particularly suitable:

$Li_2O$—$Al_2O_3$—$SiO_2$—$P_2O_5$—$TiO_2$—$GeO_2$: $Li^+$-conducting glass ceramic β-aluminum oxide: Conduction of different ions possible (e.g., $Li^+$, $Na^+$, $K^+$, $Ag^+$, $H_3O^+$, $Tl^+$, $Rb^+$, $Pb^{2+}$, $Ba^+$); particularly high conductivity for $Na^+$ β"-aluminum oxide: Conduction of different ions possible (e.g., $Li^+$, $Na^+$, $K^+$, $Ag^+$, $H_3O^+$, $Tl^+$, $Rb^+$, $Pb^{2+}$, $Ba^+$); particularly high conductivity for $Na^+$ $Cu_{16}Rb_4I_7Cl_{13}$: $Cu^+$ ion conducting $H_3MO_{12}PO_{40}*30H_2O$: proton conducting $La_{0.95}Sr_{0.05}F_{2.95}$ and $LaF_3$: $F^-$ ion conducting $Ag_4RbI_5$: $Ag^+$ ion conducting $Li_{1.3}Al_{0.3}Ti_{1.7}(PO_4)_3$: $Li^+$ ion conducting $Li_{0.34}La_{0.51}TiO_{2.94}$: $Li^+$ ion conducting NASICON (sodium super-ionic conductor): $Na^+$ ion conducting LISICON (lithium super-ionic conductor): $Li^+$ ion conducting A crucial aspect of the present invention is that the ion-conducting solid-state segments are dimensioned distinctly smaller than the corresponding known sintered bodies of the ion-conducting solid-state body, such as for example, closed-end tubes in the sodium/sulfur battery and the ZEBRA battery. The ion-conducting solid-state segments are preferably thin plate-shaped segments. Accordingly, it is preferred that the ion-conducting solid-state segments have an average diameter of no more than 100 mm, i.e., from 0.01 to 100.0 mm, in particular no more than 10 mm, i.e., from 0.01 to 10.0 mm, particularly preferred of 2 mm, i.e., from 0.1 to 2.0 mm In winding cells the diameter is particularly preferred to be less than 1 mm, i.e., from 0.1 to less than 1.0 mm Furthermore, it is preferred that the ion-conducting solid-state segments have a thickness of no more than 1.0 mm, i.e., from 0.005 to 1.0 mm, in particular of no more than 0.5 mm, i.e., from 0.005 to 0.5 mm, particularly preferred of no more than 0.02 mm, i.e., from 0.005 to 0.02 mm.

Preferably, the ion-conducting solid-state segments are so formed that the largest area coverage possible can be achieved (e.g., chess board pattern, honeycomb pattern, or similar structures) and at least frictionally, however, still more preferably positively to each other, i.e., can be interlocked with one another.

It is conceivable, therefore, that the ion-conducting solid-state segments be circular, triangular, square or honeycomb-shaped. The cohesion of the individual segments in this case is caused by the electrically insulating material between the segments.

Even more preferred are geometries that interlock with one another and thus cause a form-fitting connection (e.g., cohesion of puzzle pieces). In a particular embodiment, the ion-conducting solid-state segments are thus triangular, square or honeycomb-shaped, wherein said segments are additionally designed in a puzzle form (see FIGS. 1-5). In this case, the electronically insulating material between the segments need not have mechanical strength but may be composed of, for example, a liquid, such as an ionic liquid, or a gel.

To ensure optimal stability and flexibility of the solid-state separator, it is preferable that the electrically insulating material be present between the joints and/or guides of the ion-conducting solid-state segments, thus ensuring optimal adhesion, on the one hand, and allowing a high flexibility, on the other hand.

From the observations above, it is particularly apparent that the main part of the volume fraction in the solid-state separator can be attributed to the ion-conducting solid-state segments. Accordingly, it is preferred that the electrically insulating material be no more than 50 vol.-%, particularly no more than 15 vol.-% of said solid-state separator.

The dimensions of the solid-state separator according to the present invention are highly dependent on its application. However, it is preferred that the solid-state separator have a thickness of from 0.02 to 1.0 mm, preferably a thickness of from 0.02 to 0.5 mm, and a width of from 20 cm to 200 cm. By using a continuous production process, the separator can be manufactured as a continuous product.

The solid-state separator according to the present invention can be used in any electrochemical system. Accordingly, the present application is directed to the use of a solid-state separator, as described in this invention, in devices of the group consisting of sensors, electrochromic systems, fuel cells, battery cells, primary battery cells, secondary battery cells, redox flow systems, electrochemical synthesis devices and electrolyzers. In particular, the present invention is directed to the use of a solid-state separator according to the present invention in electrochemical energy conversion systems, such as for example, secondary battery cells or fuel cells.

Moreover, the present invention also relates to sensors, electrochromic systems, fuel cells, primary battery cells, secondary battery cells, redox flow systems or electrolyzers comprising the solid-state separator according to the present invention; in particular, the present invention is directed to electrochemical energy conversion systems, such as for example, battery cells or fuel cells comprising the solid-state separator according to the present invention.

Production of solid-state separators comprises the steps of (a) preparing the ion-conducting solid-state segments, and (b) connecting the ion-conducting solid-state segments by means of electrically insulating material.

Production of ion-conducting solid-state segments can be carried out using powders that are introduced into a mold and subsequently solidified to the ion-conducting solid-state segment. Alternatively, thin films, or films made by melting, can be produced from which the ion-conducting solid-state segments are then carved out. In the following, preferred methods are described for the corresponding materials.

In the case of ion-conducting polycrystalline solid-state segments, powders are preferably used. Here, the largest particles of the powder may not be greater than the thickness of the solid-state segment, and the particle size distribution of the particles should be very wide in order to achieve a high bulk density. With a high bulk density, shrinkage to a dense sintered body is low, and the best results in terms of mechanical stability and the specific conductivity of the sintered body can be achieved. For the simultaneous preparation of many polycrystalline segments in a first step, a mold made up of many units of the segments is filled with the powder (FIG. 6). The filling process can be carried out by dry setting or using a paste. All other techniques to fill the mold, such as for example, dipping into a suspension, electrophoresis, etc., can be applied.

In a second step, the powder is tightly compacted in order to obtain the smallest possible porosity of the green body segment. Compacting can be carried out either by static or isostatic pressing. Electrophoretic deposition of particles in the mold yields very dense green bodies as a result of this process that no longer need to be recompressed.

In a third step, the green bodies are sintered to dense (i.e., very little to no porosity) polycrystalline segments. Sintering may occur in the mold during production of the green bodies, or the green bodies are transferred first onto a flat plate on which the sintering process is subsequently performed.

A further method exists in the production of a green body film on a substrate. The coating of the substrate sheet can be carried out using any standard procedure such as knife coating, sheet die or roll-to-roll. From this coated sheet, a variety of green body segments is then, for example using a punch, simultaneously punched. This process is comparable to the punching of a puzzle from cardboard and is particularly suitable for this specific embodiment of the segments (FIG. 1 to FIG. 3). Other separation techniques such as laser cutting or water jet cutting may be used. In a last step, the segments are sintered again.

Instead of the polycrystalline ceramic, segments can be designed as glass ceramics. The difference is mainly that in glass ceramics the grain boundaries of crystalline particles are connected with an amorphous glass phase. The properties of a glass ceramic are mainly determined by temperature control during melting of the individual components and the subsequent cooling process. Production of the green bodies for the segments can be carried out in the same manner as described for the polycrystalline sintered body. The final sintering process is implemented using appropriate temperature control so as to obtain glass ceramic segments.

Another method of production consists of pulling a thin film from molten glass and punching the segments from the film at a temperature close to the softening point of the glass using a punching tool in the first step. This method is particularly suitable for interlocked structures (for example, puzzle structures). Using an appropriate temperature control during cooling, crystalline phases precipitate in the glass film segments, and segments consisting of the desired glass ceramic are obtained.

Depending on the crystal structure, ionic conductivity is not available in any spatial direction. For example in spinels (e.g., $LiMn_2O_4$), this conductivity is present in all three spatial directions; in layer structures (e.g., $NaFeO_2$), it is only present in the x and y-axis; and in olivine structures (e.g., $LiFePO_4$), it is only present in one axis. Especially for solid ion conductors that have an anisotropic ionic conductivity, it is particularly advantageous to manufacture the segments from single crystals, and to align the crystal axis such that the ionic conductivity is particularly high from one onto the other surface. One possibility is to pull a single crystal rod from a melt with a favorable orientation of the grid axes and to cut this rod into thin slices (analogous to Si-wafer production). The segments can be produced from these plates by means of suitable separation methods, such as for example laser cutting, water jet cutting, or wire sawing.

Another method includes the production of many single crystals from which the segments are formed in a first step. The single crystals may be grown for example, from a melt or solution in which the number and size of the single crystals can be influenced by seeding with single crystal nuclei and by controlling the cooling of the melt/solution. Crystal size distribution can be maintained within narrow limits, and it can be further limited by additional sieving. Depending on the crystal structure the crystals themselves may be used as segments. For example, crystals with sodium chloride structures may be cubes that at the same size can be arranged in a chess board pattern with high surface coverage. Crystals with an unfavorable geometric structure can be finished in a drum mill with a sieve to spheres of the same size, which may be arranged in a single layered, densest package to a honeycomb-like structure.

The second manufacturing step consists of the arrangement of the crystals or crystal spheres to a single layer with high surface coverage. For this, the crystals are poured onto a flat plate or a liquid film of higher specific density (e.g., a layer of mercury), and the limiting side faces are displaced so far to the center of plate/metal bath until the desired arrangement of the segments is achieved. It is advantageous to set the plate/ the metal bath under vibration to cause a slight movement of the crystals or crystal spheres. In a solid-state electrolyte that has an anisotropic ionic conductivity, anisotropy of the permittivity is also present; that is to say, the crystals or the crystal spheres can be oriented by simultaneous action of a strong electric field during arrangement to a surface, with respect to their orientation.

The third manufacturing step is the connecting of the crystals/crystal spheres to form a flat network. Since a mechanical interlock is not possible in this case, only polymers can be used as the connecting material. The relevant techniques are described in the next section.

The outer dimensions of the crystals or the diameter of the crystal spheres is preferably between 0.5 and 5 mm. This results in a thickness of the solid-state separators after connecting the crystals/crystal spheres in the same order of magnitude and is for most applications approximately an order of magnitude too large. The material is therefore reduced in thickness in a fourth manufacturing step. Here, it is advantageous to produce the connection of the crystals/ crystal spheres on a support material (e.g., a metal band) or to adhere the connected material to a support. From the surface so much material is removed that half of the original thickness plus half the thickness of the final solid-state separators remains on the support material. Subsequently, the finished side is adhered to a further support and the first support material is removed again. From the side that becomes accessible so much material is removed in the same way that the final separator thickness is obtained, and then the support is removed from the solid-state separator. To remove the material, methods such as grinding, sand(sphere) blasting, ion beam etching, laser vaporization or other removal techniques may be applied.

Depending on the geometry of the segments, these can either be arranged only into mosaics with a high surface coverage (round disks, hexagons, squares, equilateral triangles) or be mechanically interlocked with each other (e.g., puzzle structures). Depending on the manufacturing method of the individual segments different positioning techniques are conceivable. For segments without mechanical interlocking, the segments can be distributed on a flat surface (e.g., a metal band) without aligning to each other. Then by pushing together the lateral boundary, the segments can be arranged into structures with a high surface coverage. This method is particularly preferred for round disks and hexagons because for the orientation of the segments with respect to the resulting pattern either no rotation (round disks) or only a very low rotation (hexagons which are arranged into a honeycomb pattern) is required. For segments which interlock with each other mechanically, manufacturing processes are preferred in which the green bodies are manufactured already correctly aligned and interlocked. Particularly preferred is the punching of the segments of a green body sheet.

In the following, the introduction of the electrically insulating material is described.

For the mechanically interlocked segments a solid mechanical connection of the electrically insulating material, which fills the gaps, is not absolutely necessary since a displacement of the segments against each other due to the mechanical interlocking is prevented. Therefore, in such cases especially liquids are applied. The liquid also serves to shut off the catholyte region on one side of the solid-state separator and against the anolyte region on the other side of the solid-state separator. Thus, in order not to hinder or prevent the ion passage from the catholyte and anolyte region filling medium (in contact with the solid-state segments) by a liquid film (barrier liquid in the interstitial spaces), the liquid is not allowed to wet the (glass) ceramics on the outer surfaces which are in contact with the catholyte or anolyte region. On the other hand, the bather liquid should wet the surfaces of the narrow segments completely to cause a hermetic separation between the catholyte and anolyte region. This can be achieved by coating the small surfaces of the segments with a thin solid film that is completely wetted by the barrier liquid. The coating may be achieved, for example, via a photoresistant lacquer. In a first step, the segments are completely thinly coated with a lacquer (dipping, spray coating, etc.), and then the surfaces of the segments are exposed. As the narrow surfaces of the segments are perpendicular to the surfaces not to be coated, with a vertical illumination no radiation falls on the narrow areas and the lacquer coating is retained during subsequent development of the positive photoresistant lacquer on the narrow surfaces. The adjacent surfaces to the catholyte or anolyte region are uncoated after development. A requirement for the use of barrier liquids is the non-wettability of the liquid with the solid ionic conductor and a good wettability of the lacquer layer.

The polymer may be dissolved in a solvent, and this solution can, for example using a coating knife, be put in the gaps between the segments. By evaporating the solvent, the polymer is precipitated, fills the gaps between the segments, and connects them. The process must be repeated several times because by evaporating the solvent, volume shrinkage occurs and the gaps are not completely filled in one step with polymer. Instead of using polymer solutions, liquid polymer oligomers can be used which crosslink to the polymer by polyaddition or polycondensation.

Mechanically interlocked geometries are particularly advantageous as the segments cannot move against each other during the coating knife process. Segments that are not mechanically interlocked, such as for example the honeycomb structure, may be fixed on an adhesive film (support film) which is removed from the surface of the solid-state separator after solidification of the polymer. It is particularly advantageous that the surface be protected by the adhesive of the adhesive film from unwanted coating with the polymer. The opposite surface is furnished by the process with a thin polymer film, which must be removed. This can be performed by dissolving in a solvent (wash down), mechanically (e.g., grinding), via ion beam etching or evaporation with a laser, or other removal processes.

Alternatively, the surface opposite the support film may, for example, be provided with a protective film by printing that prevents wetting with the polymer solution/liquid polymer oligomers during knife coating. This protective film is removed using a solvent after solidification of the polymer.

The invention claimed is:

1. Solid-state separator for electrochemical systems, the solid-state separator comprising a plurality of ion-conducting solid-state segments, and individual solid-state segments are connected by means of a deformable, electrically insulating material present between joints and/or guides of the ion-conducting solid state segments ensuring adhesion and providing flexibilty, wherein the ion-conducting solid-state segments are thin plate-shaped segments selected from the group consisting of a glass ceramic formed from $Li_2O$—$Al_2O_3$—$SiO_2$—$P_2O_5$—$TiO_2$—$GeO_2$, β-aluminum oxide, $Cu_{1.6}Rb_4I_7Cl_{13}$, $La_{0.95}Sr_{0.05}F_{2.95}$, $LaF_3$, $Ag_4RbI_5$, $Li_{1.3}Al_{0.3}Ti_{1.7}(PO_4)_3$, $Li_{0.34}La_{0.51}TiO_{2.94}$, $NA_{1+x}Zr_2Si_xP_{3-x}O_{12}$ with $0<x<3$, and $Li_{2+2x}Zn_{1-x}GeO_4$ with $-0.36<X<0.87$, and wherein the ion-conducting solid-state segments resemble the main part of the solid-state separator being present in an amount of at least 85 Vol. %.

2. Solid-state separator according to claim 1, wherein the deformable, electrically insulating material is an adhesive material, a polymer, an organic liquid, or an inorganic liquid.

3. Solid-state separator according to claim 1, wherein the electrically insulating material is selected from the group consisting of methyl methacrylate adhesives, radiation-curing adhesives, phenol formaldehyde resin adhesives, silicones, silane-crosslinking polymer adhesives, epoxy resin adhesives, polyurethane adhesives, imidazolium compounds, pyridinium compounds, piperidinium compounds, tetraalkyl ammonium compounds and thermoplastic polymers.

4. Solid-state separator according to claim 1, wherein the ion-conducting solid-state segments have an average diameter of no more than 100 mm.

5. Solid-state separator according to claim 1, wherein the ion-conducting solid-state segments have a thickness of no more than 1 mm.

6. Solid-state separator according to claim 1, wherein the ion-conducting solid-state segments are circular, triangular, square or honeycomb-shaped.

7. Solid-state separator according to claim 1, wherein the ion-conducting solid-state segments are interlocked.

8. Solid-state separator according to claim 1, wherein the electrically insulating material is present between joints of the ion-conducting solid-state segments.

9. Solid-state separator according to-claim 1, wherein the solid-state separator has a thickness of from 1 to 0.02 mm, and a width of from 200 mm to 2000 mm.

10. Solid-state separator according to claim 1, wherein the electrically insulating material is no more than 50 vol. -% of said solid-state separator.

11. A solid-state separator according to claim 1, being provided in devices selected from the group consisting of sensors, electrochromic systems, battery cells, primary battery cells, secondary battery cells, redox flow systems, electrochemical synthesis devices and electrolyzers.

12. Production of the solid-state separator according to claim 1, comprising the steps of:
   (a) preparing the ion-conducting solid-state segments; and
   (b) connecting the ion-conducting solid-state segments by means of electrically insulating material.

* * * * *